United States Patent
Matsui et al.

(10) Patent No.: US 7,162,563 B2
(45) Date of Patent: Jan. 9, 2007

(54) SEMICONDUCTOR INTEGRATED CIRCUIT HAVING CHANGEABLE BUS WIDTH OF EXTERNAL DATA SIGNAL

(75) Inventors: Satoshi Matsui, Kawasaki (JP); Seiji Suetake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 10/898,339

(22) Filed: Jul. 26, 2004

(65) Prior Publication Data

US 2005/0182885 A1    Aug. 18, 2005

(30) Foreign Application Priority Data

Feb. 16, 2004    (JP)    .............................. 2004-038043

(51) Int. Cl.
*G06F 13/40*    (2006.01)
*G06F 12/00*    (2006.01)

(52) U.S. Cl. ........................ 710/307; 710/104; 711/218

(58) Field of Classification Search .................. 710/33, 710/62, 100, 107, 306, 307, 316; 711/103, 711/168; 712/38; 326/38, 41; 365/189.5, 365/201; 370/536
See application file for complete search history.

(56) References Cited

U.S. PATENT DOCUMENTS

| | | | | |
|---|---|---|---|---|
| 4,656,620 A * | 4/1987 | Cox | .............................. | 370/536 |
| 5,113,369 A * | 5/1992 | Kinoshita | ..................... | 710/307 |
| 5,473,758 A * | 12/1995 | Allen et al. | ................... | 711/103 |
| 5,537,659 A * | 7/1996 | Nakao | .......................... | 710/307 |
| 5,613,078 A * | 3/1997 | Kishigami | ................... | 710/307 |
| 5,761,455 A * | 6/1998 | King et al. | .................. | 710/316 |
| 5,822,779 A * | 10/1998 | Intrater et al. | ............... | 711/168 |
| 5,835,738 A * | 11/1998 | Blackledge et al. | ......... | 710/307 |
| 5,911,053 A * | 6/1999 | Pawlowski et al. | .......... | 710/307 |
| 5,936,953 A * | 8/1999 | Simmons | ..................... | 370/364 |
| 5,991,212 A * | 11/1999 | Ishida | ......................... | 365/201 |
| 6,020,760 A * | 2/2000 | Sample et al. | .................. | 326/41 |
| 6,031,767 A * | 2/2000 | Schuh et al. | ............ | 365/189.05 |
| 6,055,594 A * | 4/2000 | Lo et al. | ...................... | 710/100 |
| 6,057,705 A * | 5/2000 | Wojewoda et al. | ............ | 326/38 |
| 6,108,726 A * | 8/2000 | Runaldue et al. | .............. | 710/62 |
| 6,226,736 B1 * | 5/2001 | Niot | ............................. | 712/38 |
| 6,262,594 B1 * | 7/2001 | Cheung et al. | ................. | 326/38 |
| 6,339,800 B1 * | 1/2002 | Won et al. | ...................... | 710/33 |
| 6,581,115 B1 * | 6/2003 | Arimilli et al. | .............. | 710/107 |
| 6,587,901 B1 * | 7/2003 | Nishikawa et al. | .......... | 710/100 |
| 6,831,479 B1 * | 12/2004 | Lo | ................................ | 326/38 |
| 6,970,013 B1 * | 11/2005 | Cory | ............................ | 326/28 |
| 7,043,592 B1 * | 5/2006 | Nagano | ....................... | 710/307 |
| 2002/0174282 A1 * | 11/2002 | Murakami et al. | ........... | 710/306 |

FOREIGN PATENT DOCUMENTS

JP          62-256145          11/1987

\* cited by examiner

*Primary Examiner*—Christopher E. Lee
(74) *Attorney, Agent, or Firm*—Staas & Halsey LLP

(57) ABSTRACT

A data controlling unit activates a predetermined number of data terminals according to a mode signal and changes a bus width of external data signal. According to the mode signal, an address controlling unit selects a predetermined number of bits of an internal address signal outputted from a controller and outputs the selected bits as an external address signal. Specifically, the address controlling unit selects upper bits of the internal address signal when the bus width of the external data signal is increased according to the mode signal. Therefore, it is possible to prevent occurrence of an unused external address terminal, enabling the increase in accessible external memory capacity.

14 Claims, 13 Drawing Sheets

| mode signal MD1, MD0 | "00" | "01" | "10" | "11" |
|---|---|---|---|---|
| data bus width | 8 bits | 16 bits | 32 bits | 64 bits |
| memory capacity | 4kB | 8kB | 16kB | 32kB |
| external address signal | | internal address signal | | |
| ADD11 | IA11 | IA12 | IA13 | IA14 |
| ADD10 | IA10 | IA11 | IA12 | IA13 |
| ADD9 | IA9 | IA10 | IA11 | IA12 |
| ADD8 | IA8 | IA9 | IA10 | IA11 |
| ADD7 | IA7 | IA8 | IA9 | IA10 |
| ADD6 | IA6 | IA7 | IA8 | IA9 |
| ADD5 | IA5 | IA6 | IA7 | IA8 |
| ADD4 | IA4 | IA5 | IA6 | IA7 |
| ADD3 | IA3 | IA4 | IA5 | IA6 |
| ADD2 | IA2 | IA3 | IA4 | IA5 |
| ADD1 | IA1 | IA2 | IA3 | IA4 |
| ADD0 | IA0 | IA1 | IA2 | IA3 |

Fig. 3

| MD1, MD0 | "00" | "01" | "10" | "11" |
|---|---|---|---|---|
| SEL2 | H (ADD2) | H (ADD2) | H (ADD2) | L (ADD14) |
| SEL1 | H (ADD1) | H (ADD1) | L (ADD13) | L (ADD13) |
| SEL0 | H (ADD1) | L (ADD12) | L (ADD12) | L (ADD12) |
| data bus width | 8 bits | 16 bits | 32 bits | 64 bits |
| memory capacity | 4kB | 8kB | 16kB | 32kB |
| external address signal | | internal address signal | | |
| ADD11 | IA11 | IA11 | IA11 | IA11 |
| ADD10 | IA10 | IA10 | IA10 | IA10 |
| ADD9 | IA9 | IA9 | IA9 | IA9 |
| ADD8 | IA8 | IA8 | IA8 | IA8 |
| ADD7 | IA7 | IA7 | IA7 | IA7 |
| ADD6 | IA6 | IA6 | IA6 | IA6 |
| ADD5 | IA5 | IA5 | IA5 | IA5 |
| ADD4 | IA4 | IA4 | IA4 | IA4 |
| ADD3 | IA3 | IA3 | IA3 | IA3 |
| ADD2 | IA2 | IA2 | IA2 | IA14 |
| ADD1 | IA1 | IA1 | IA13 | IA13 |
| ADD0 | IA0 | IA12 | IA12 | IA12 |

Fig. 10

SEMICONDUCTOR INTEGRATED CIRCUIT HAVING CHANGEABLE BUS WIDTH OF EXTERNAL DATA SIGNAL

CROSS-REFERENCE TO RELATED APPLICATIONS

This application is based upon and claims the benefit of priority from the prior Japanese Patent Application No. 2004-038043, filed on Feb. 16, 2004, the entire contents of which are incorporated herein by reference.

BACKGROUND OF THE INVENTION

1. Field of the Invention

The present invention relates to a semiconductor integrated circuit that outputs an address signal for accessing a semiconductor memory.

2. Description of the Related Art

A semiconductor integrated circuit such as a microcomputer generally has address terminals outputting address signals (for example, Japanese Unexamined Patent Application Publication No. Sho 62-256145). The number of address terminals (the number of bits of addresses) is determined individually for each semiconductor integrated circuit. For example, 12-bit address terminals are necessary for accessing a 4 k memory area, and 13-bit address terminals are necessary for accessing an 8 k memory area.

SUMMARY OF THE INVENTION

It is an object of the present invention to reduce product cost of a semiconductor integrated circuit by eliminating an unused address terminal.

It is another object of the present invention to access semiconductor memories of different capacities without any change in the number of address terminals.

According to one of the aspects of the semiconductor integrated circuit of the present invention, a data controlling unit activates a predetermined number of data terminals among a plurality of data terminals according to a mode signal. The data controlling unit receives/outputs an external data signal from/to an external memory via the active data terminals, and converts the external data signal to an internal data signal with a bus width corresponding to a controller in order to receive/output the external data signal from/to the controller. An address controlling unit selects a predetermined number (a fixed value) of bits of an internal address signal outputted from the controller according to the mode signal, and outputs an address signal consisting of the selected bits to the external memory as an external address signal in order to access the external memory. Specifically, the address controlling unit sequentially selects upper bits of the internal address signal when a bus width of the external data signal is sequentially increased according to the mode signal.

Since the bits of the internal address signal outputted as the external address signal are switched in the semiconductor integrated circuit when the bus width of the data signals is increased, it is possible to prevent occurrence of an unused external address terminal and the increase in product cost caused by the formation of the unused external address terminal. Moreover, increase in capacity of accessible external memory is realized. Therefore, it is possible to access semiconductor memories of different capacities without any change in the number of address terminals.

According to a preferable example in the aspect of the semiconductor integrated circuit of the present invention, the mode signal is a signal representing the bus width (2 bits to the mth power) of the external data signal. The address controlling unit selects continuous n bits of the internal address signal, and every time the "m" is increased by one, shifts the bit group to be selected of the internal address signal to an upper order by one bit. Consequently, switching of the internal address signal to be outputted as the external address signal is realized by simple control.

According to a preferable example in the aspect of the semiconductor integrated circuit of the present invention, each of a plurality of selectors corresponding to the bits of the external address signal, respectively, selects one of the continuous plural bits of the internal address signal according to the mode signal. Consequently, switching of the internal address signal to be outputted as the external address signal is realized with a simple circuit configuration.

According to a preferable example in the aspect of the semiconductor integrated circuit of the present invention, the mode signal is a signal representing the bus width (2 bits to the mth power) of the external data signal. The address controlling unit selects continuous n bits of the internal address signal and switches a lower bit of variable bits to an upper bit subsequent to the upper most bit of fixed bits every time the "m" is increased by one. Here, the n bits consist of: the fixed bits that are predetermined bits of the internal address signal and are constantly outputted as a part of the external address signal; and the variable bits which are different bits of the internal address signal and one of which is selected according to the mode signal to be outputted as an another part of the external address signal. Since a part of the bits (the fixed bits) of the internal address signal are constantly outputted as a part of the external address signal, switching of the internal address signal to be outputted as a part of the external address signal is realized by simpler control.

According to a preferable example in the aspect of the semiconductor integrated circuit of the present invention, at least one selector corresponds to a lower bit of the external address signal and selects one of 2 bits of the internal address signal according to the mode signal. Consequently, switching of the internal address signal to be outputted as the external address signal is realized with the minimum number of selectors.

According to a preferable example in the aspect of the semiconductor integrated circuit of the present invention, a bus width switching register holds a logic value represented by the mode signal. A data bus transmits rewrite data outputted from the controller to the bus width switching register in order for the controller to rewrite the logic value held by the bus width switching register. The address controlling unit and the data controlling unit operate according to the logic value held by the bus width switching register. Since the logic value of the mode signal is held by the bus width switching register, it is possible to rewrite the logic value of the mode signal by software. Consequently, it is possible to respond to specification changes or the like by a user.

According to a preferable example in the aspect of the semiconductor integrated circuit of the present invention, a mode terminal receives the mode signal from an exterior of the semiconductor integrated circuit. The logic value held by the bus width switching register is set according to the mode signal supplied to the mode terminal, until the logic value is rewritten by the controller. Therefore, it is possible to set the logic value of the mode signal not only by hardware but also by software. The construction of a user-friendly memory system is realized by, for example, supplying an initial value of the mode signal to the mode terminal by hardware and rewriting the initial value held by the bus width switching register by software when necessary.

According to a preferable example in the aspect of the semiconductor integrated circuit of the present invention, a program circuit outputs the mode signal according to a predetermined logic value that is programmed in advance. The logic value held by the bus width switching register is set according to the mode signal outputted from the program circuit until the logic value is rewritten by the controller. Therefore, it is possible to set the logic value (initial value) of the mode signal during a fabrication process of the semiconductor integrated circuit, and thereafter, to rewrite the logic value of the mode signal by software on a user system.

According to a preferable example in the aspect of the semiconductor integrated circuit of the present invention, a mode terminal receives the mode signal from an exterior of the semiconductor integrated circuit. Therefore, the bits of the internal address signal used as the external address signal can be easily set from the exterior of the semiconductor integrated circuit.

According to a preferable example in the aspect of the semiconductor integrated circuit of the present invention, a program circuit has a predetermined logic value programmed in advance and outputs the mode signal according to the predetermined logic value. Therefore, it is possible to set the logic value (initial value) of the mode signal during a fabrication process of the semiconductor integrated circuit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 is an explanatory table showing the operation of the address controlling unit shown in FIG. 2;

FIG. 10 is an explanatory table showing the operation of the address controlling unit shown in FIG. 9;

DESCRIPTION OF THE PREFERRED EMBODIMENTS

Figure 1:
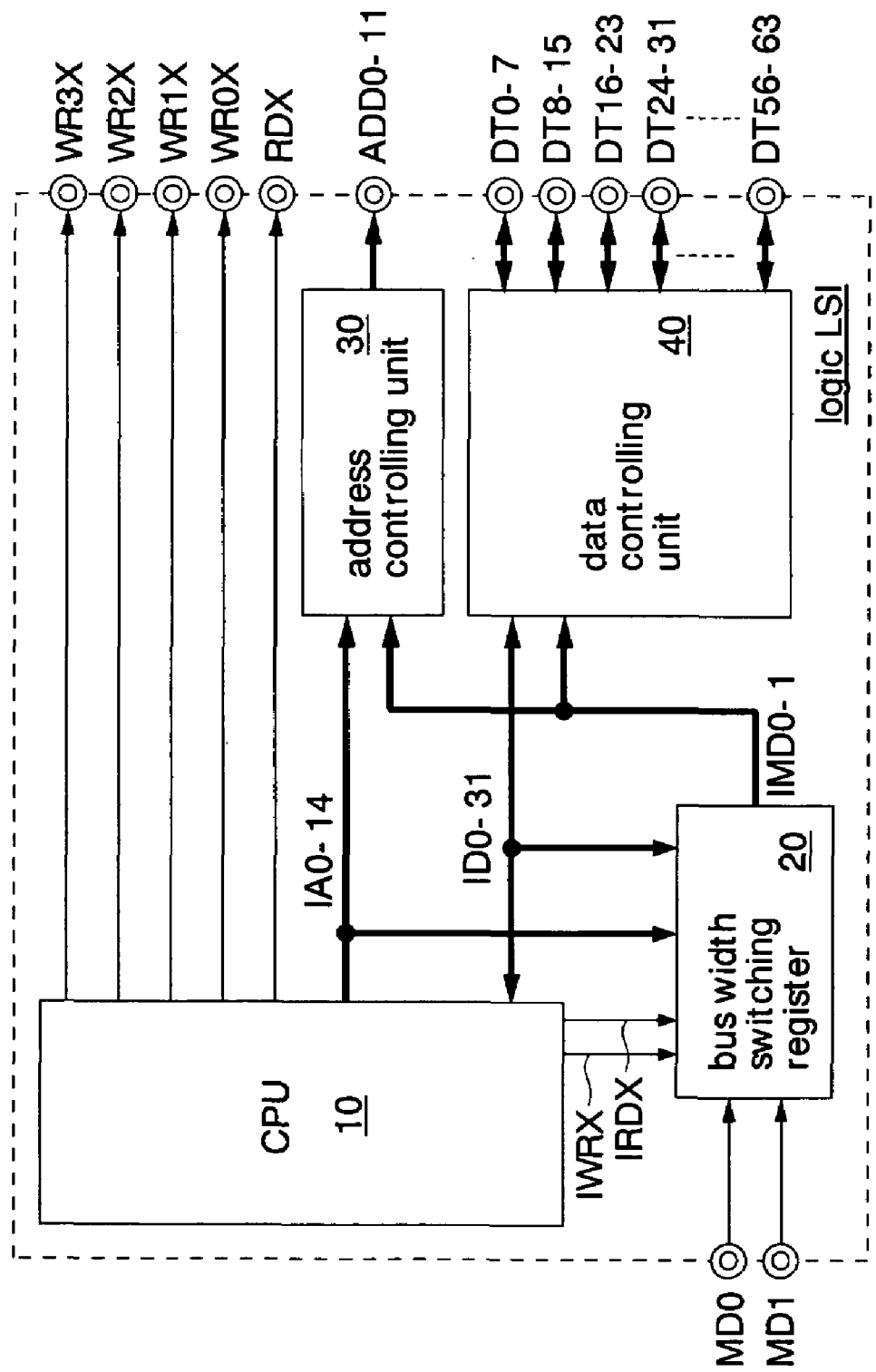
FIG. 1 is a block diagram showing a first embodiment of the semiconductor integrated circuit of the present invention.

The present invention was made in order to solve the following problems.

The number of bits of an address signal that a microcomputer or the like outputs for accessing a semiconductor memory is fixed for each product. Further, the number of bits of an address signal necessary for accessing a semiconductor memory with a larger number of bits (bus width) of a data signal (for example, ×16 bits) is smaller than the number of bits of an address signal necessary for accessing a semiconductor memory with a smaller number of bits of a data signal (for example, ×8 bits), if these semiconductor memories have the same memory capacity. Therefore, in a case where a semiconductor memory with the number of bits of a data signal being 16 is connected to a microcomputer adaptable both to semiconductor memories with the number of bits of a data signal being 8 bits and with the number of bits of a data signal being 16 bits, one bit of address terminals of the microcomputer is not used. Similarly, in a case where a semiconductor memory with the number of bits of a data signal being 32 bits is connected to a microcomputer adaptable to semiconductor memories with the number of bits of data signals being 8 bits, 16 bits, and 32 bits, 2 bits of address terminals of the microcomputer are not used.

The larger the chip size of a semiconductor integrated circuit is, the higher the chip cost thereof is. The chip size increases as the number of terminals increases. Therefore, it is disadvantageous in light of chip cost to form an unused address terminal on a semiconductor integrated circuit. In other words, the existence of an address terminal that is not used in actual access will increase product cost of a semiconductor integrated circuit.

Further, in a conventional microcomputer, in a case where a semiconductor memory whose bus width of a data signal is large is connected to the microcomputer, it is not possible to utilize the aforesaid unused address terminal to connect a semiconductor memory having a larger capacity.

Hereinafter, embodiments of the present invention will be described using the drawings. The double circles in the drawings represent external terminals. In the drawings, each signal line represented by the heavy line consists of a plurality of lines. Part of blocks to which the heavy lines are connected is constituted of a plurality of circuits. The same reference numerals and symbols as those of the external terminals are used to designate signals supplied via the external terminals. The same reference numerals and symbols as those of signals are used to designate signal lines through which the signals are transmitted.

Each signal whose reference symbol ends in "X" presents a negative logic.

FIG. 1 shows a first embodiment of the semiconductor integrated circuit of the present invention. This semiconductor integrated circuit is formed as a logic LSI having a built-in CPU. The logic LSI has a CPU core 10 (a controller), a bus width switching register 20, an address controlling unit 30, and a data controlling unit 40. In addition to these elements, peripheral functions such as a timer, a serial interface, and an A/D converter, a built-in ROM, and so on are also mounted on the logic LSI, though they are not specifically shown in the drawing.

The operation of the CPU core 10 is such that it reads and executes a program written to the built-in ROM or an external memory connected thereto via the external terminal. When executing a write operation, the CPU core 10 outputs internal address signals IA (IA0–14) and internal data signals ID (ID0–31) to an internal address bus IA and an internal data bus ID respectively, and asserts at least one of write signals WR0X–WR3X low. When executing a read operation, the CPU core 10 outputs the internal address signals IA0–14 and asserts a read signal RDX low.

The bus width switching register 20 holds logic levels of mode signals MD (MD1–0) received at mode terminals thereof and outputs the held levels as internal mode signals IMD (IMD1–0). The bus width switching register 20 is connected to the internal address bus IA and the internal data bus ID and is allocated as a memory mapped I/O. Therefore, when the CPU core 10 outputs an address signal indicating the bus width switching register 20 and an internal write signal IWRX to the internal address bus IA and outputs a predetermined value (rewrite data) to the internal data bus ID, the values held in the bus width switching register are rewritten. Further, the CPU core 10 can read the values (set values of the bus width) held in the bus width switching register 20 via the internal data bus ID during a test mode or the like in such a manner that the CPU core 10 outputs an internal read signal IRDX and outputs an address indicating the bus width switching register 20 to the internal address bus IA. The logic values held in the bus width switching register 20 are set according to the mode signals MD1–0 supplied to the mode terminals until the logic values are rewritten by the CPU core 10.

According to the internal mode signals IMD1–0 representing the logic values held in the bus width switching register 20, the address controlling unit 30 selects continuous 12 bits of the internal address signal IA0–14 supplied from the CPU core 10, and outputs the selected bits as external address signal ADD (ADD0–11) to address terminals.

During the read operation, the data controlling unit 40 converts external data signals (read data) inputted to data terminal groups DT0–7, DT8–15, DT16–23, DT24–31, . . . , DT56–63 respectively to 32-bit internal data signals ID0–31, according to the internal mode signals IMD1–0 representing the logic values held in the bus width switching register 20, and outputs the internal data signals ID0–31 to the CPU core 10. Further, during the write operation, the data controlling unit 40 divides the internal data signals ID0–31 (write data) outputted from the CPU core 10 into external data signals DT0–7, DT8–15, DT16–23, DT24–31, . . . , DT56–63, according to the internal mode signals IMD1–0 and outputs these external data signals to the external terminals.

Note that when the logics of the mode signals MD1–0 are "00", "01", "10", and "11", the logic LSI sets the bus width of the external data signal DT to 8 bits, 16 bits, 32 bits, and 64 bits, respectively, and activates the external data terminals DT0–7, DT0–15, DT0–31, DT0–63, respectively.

Figure 2:
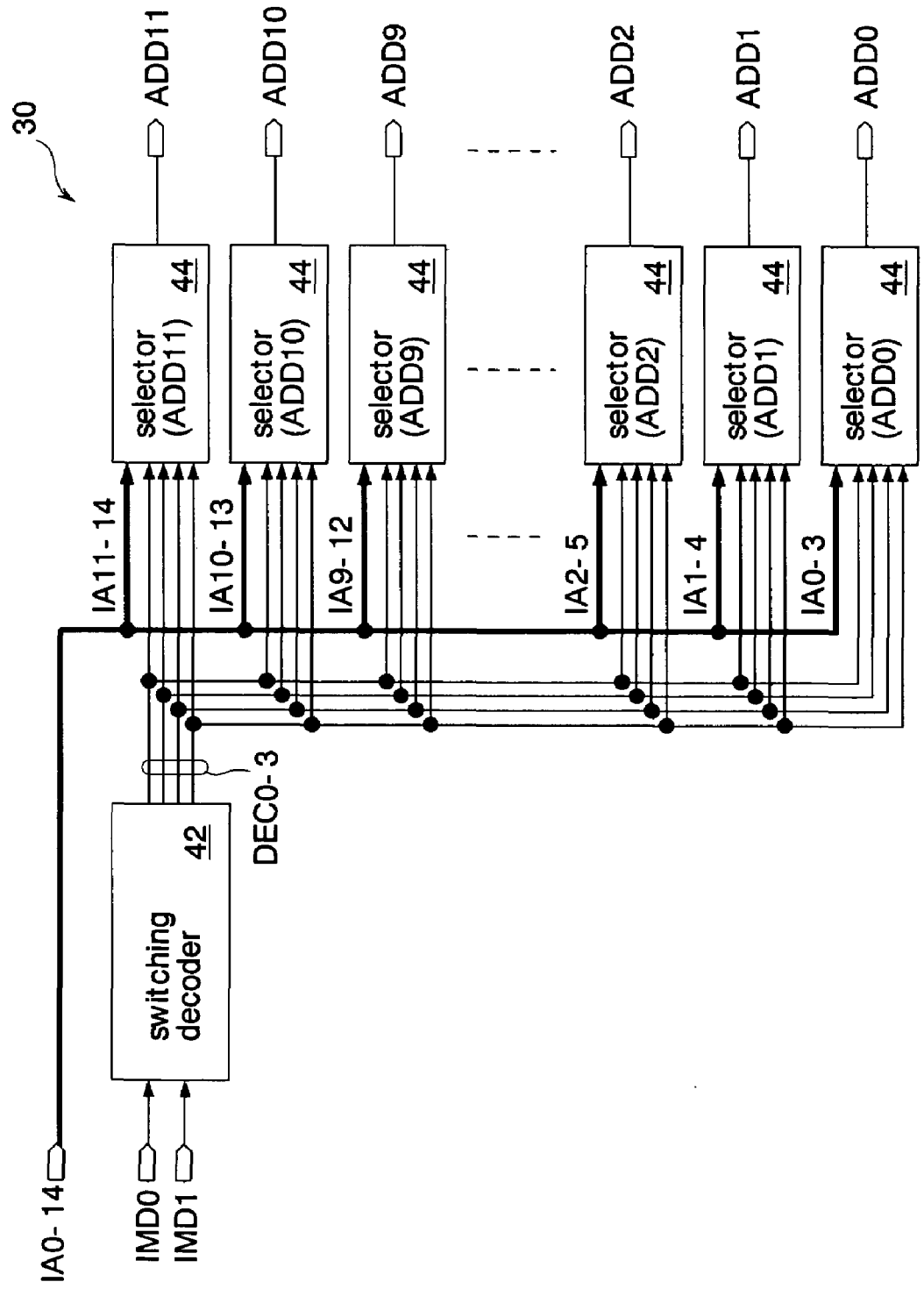
FIG. 2 is a block diagram showing in detail an address controlling unit shown in FIG. 1.

FIG. 2 shows in detail the address controlling unit 30 shown in FIG. 1. The address controlling unit 30 has a switching decoder 42 and selectors 44 corresponding to respective bits of the external address signal ADD0–11.

The switching decoder 42 changes one of decoded signals DEC0–3 (DEC) from a low level to a high level according to the levels of the internal mode signals IMD1–0. For example, when the logics of the internal mode signals IMD1–0 are "00", "01", "10", and "11", only the decoded signals DEC0, DEC1, DEC2, DEC3 change to a high level respectively.

Each of the selectors 44 selects one bit corresponding to the high-level decoded signal DEC, out of the 4-bit internal address signal IA (for example, IA11–14), and outputs the selected bit as the external address signal ADD. 3 bits out of 4 bits of the internal address signals IA received by the selectors 44 corresponding to the external address signals ADD whose bits are adjacent to each other are the same.

FIG. 3 shows the operation of the address controlling unit 30 shown in FIG. 2. As described above, when the logics of the mode signals MD1–0 are "00", "01", "10", and "11", the logic LSI sets the bus width of the external data signal DT to 8 bits (2 bits to the third power; one byte), 16 bits (2 bits to the fourth power; 2 bytes), 32 bits (2 bits to the fifth power; 4 bytes), and 64 bits (2 bits to the sixth power; 8 bytes), respectively. This means that the mode signals MD1–0 are signals representing the bus width (2 bits to the mth power) of the external data signal DT. When the logics of the mode signals MD1–0 are "00", "01", "10", and "11", the logic LSI reads/writes data of 1 byte, 2 bytes, 4 bytes, and 8 bytes at one address respectively.

When the logics of the mode signals MD1–0 are "00", "01", "10", and "11", the address controlling unit 30 outputs the 12-bit internal address signals IA11–0, IA12–1, IA13–2, IA14–3 as the external address signals ADD11–0 respectively. Thus, when the bus width of the external data signal DT is sequentially increased according to the mode signals MD1–0, upper bits of the internal address signal IA are sequentially selected. In more detail, the address controlling unit 30 constantly selects continuous 12 bits of the internal address signal IA, and shifts the selected bit group of the internal address signal IA to an upper order by one bit every time "m" in 2 bits to the mth power of the external data signal DT increases by one.

When the logics of the mode signals MD1–0 are "00", "01", "10", and "11", the memory capacities accessible by the logic LSI are 4 kB (kilobyte), 8 kB, 16 kB, and 32 kB respectively. The bits of the internal address signal IA outputted as the external address signal ADD are thus shifted to an upper order when the bus width of the external data signals DT increases, and whereby it is made possible to eliminate the existence of an unused address terminal and, moreover, to increase an accessible memory capacity.

Figure 4:
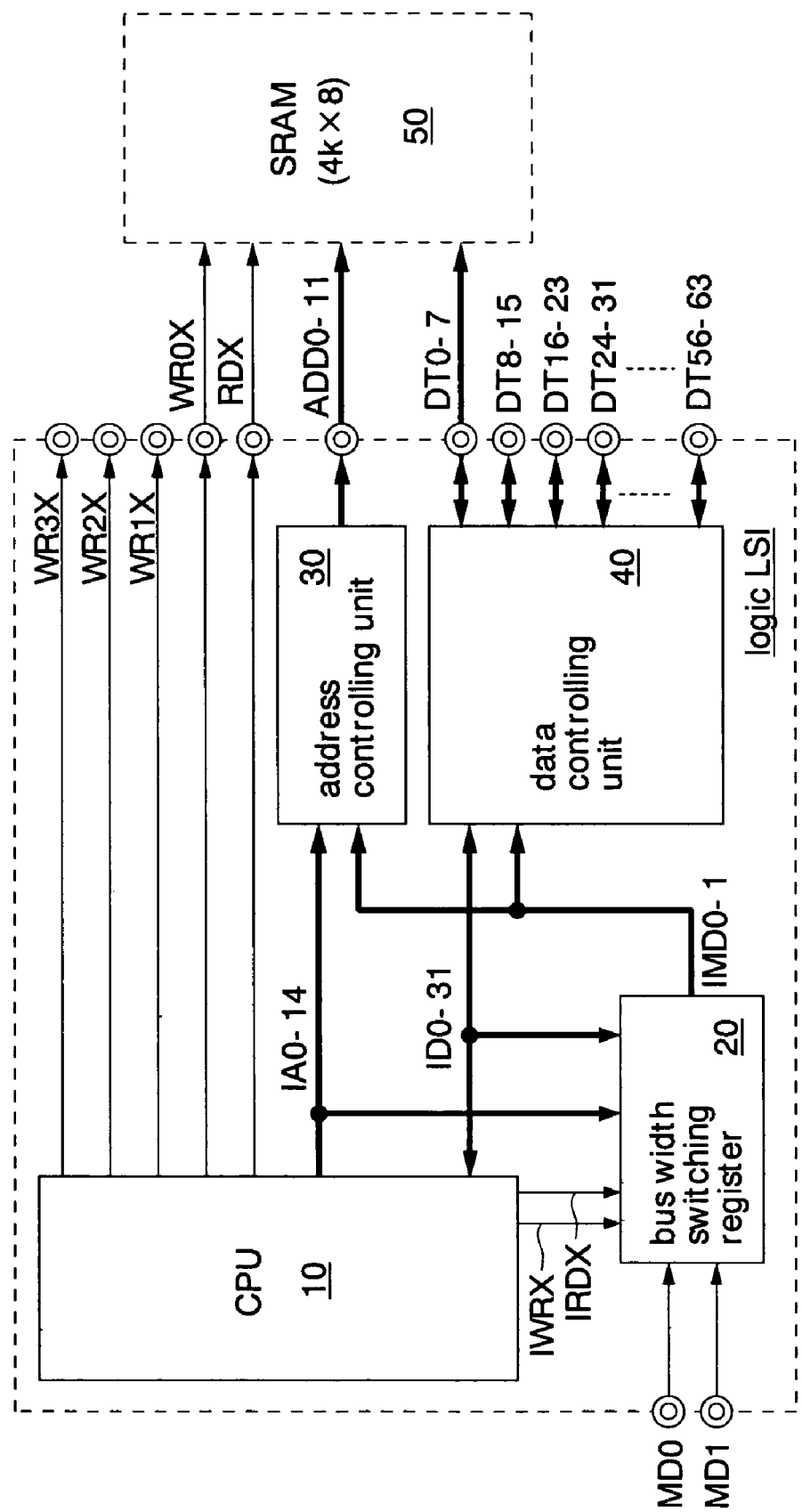
FIG. 4 is a block diagram showing an example where an SRAM is connected to a logic LSI of the first embodiment.

FIG. 4 shows an example where an SRAM (external memory) is connected to the logic LSI of the first embodiment. In this example, a 4-kbyte SRAM 50 having 12-bit address terminals (4 k address space) and 8-bit (one-byte) data terminals is connected to the logic LSI on a system board. The address terminals and the data terminals of the SRAM 50 are connected to the address terminals ADD0–11 and the data terminals DT0–7 of the logic LSI respectively. Here, the system board constantly supplies the logic LSI with the mode signals MD1–0 having "logics 00". This causes the logic LSI to operate under the recognition that the bus width of the active external data signal DT is 8 bits (DT0–7). According to the mode signals MD1–0, the address controlling unit 30 outputs, as the external address signal ADD0–11, the internal address signal IA0–11 outputted from the CPU core 10. Note that the data terminals DT8–63 not in use are used as, for example, port terminals or the like.

The CPU core 10 asserts the read signal RDX when reading data from the SRAM 50, and asserts the write signal WR0X when writing data to the SRAM 50. The read operation and the write operation are both executed in a unit of 8 bits.

Figure 5:
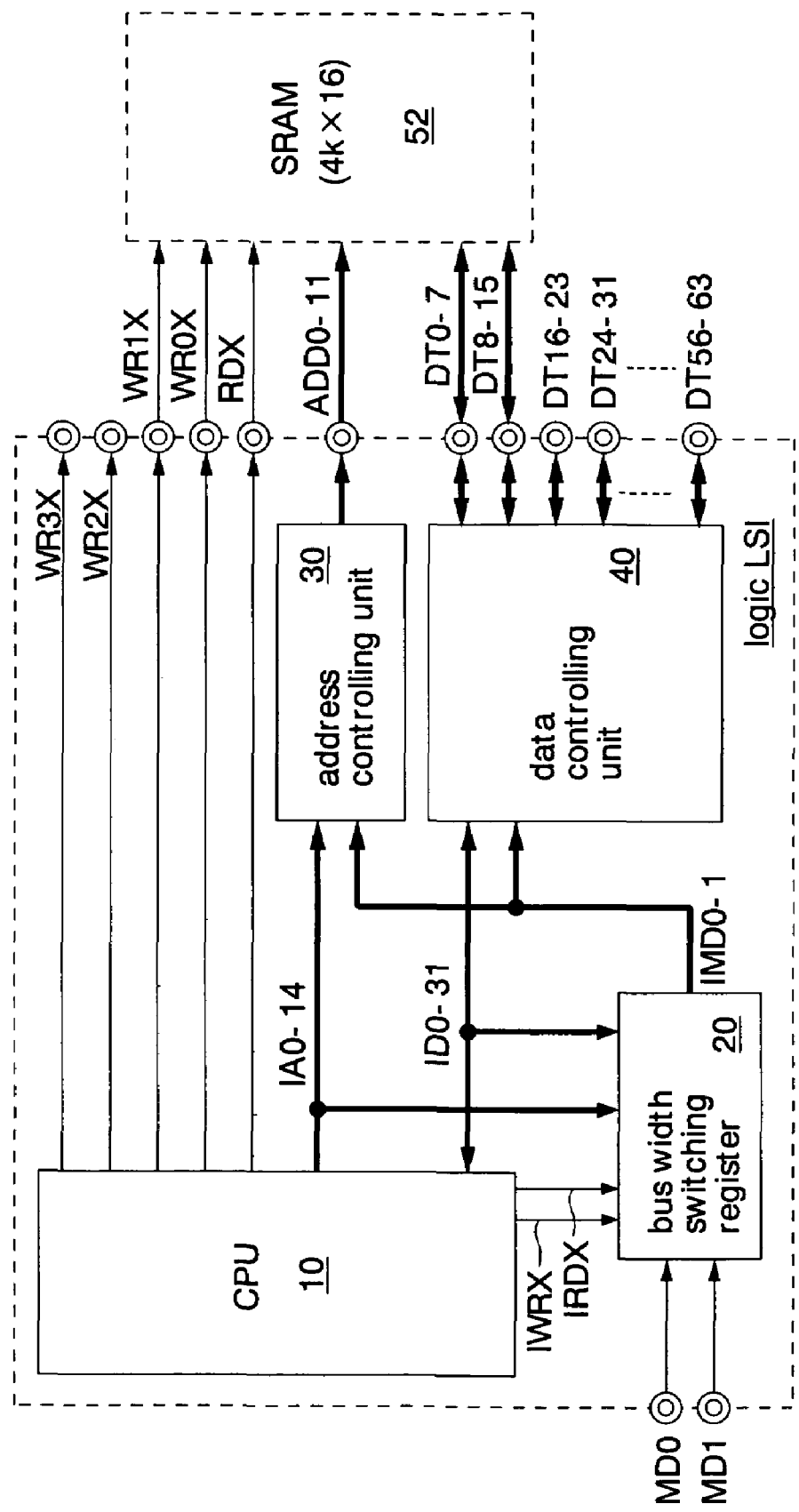
FIG. 5 is a block diagram showing an example where another SRAM is connected to the logic LSI of the first embodiment.

FIG. 5 shows an example where a different SRAM (external memory) is connected to the logic LSI of the first embodiment. In this example, an 8-kbyte SRAM 52 having 12-bit address terminals (4 k address space) and 16-bit (4-byte) data terminals is connected to the logic LSI on the system board. The address terminals and the data terminals of the SRAM 52 are connected to the address terminals ADD0–11 and the data terminals DT 0–15 of the logic LSI respectively. Here, the system board constantly supplies the logic LSI with the mode signals MD1–0 having "logics 01". This causes the logic LSI to operate under the recognition that the bus width of the active external data signal DT is 16 bits (DT0–15). According to the mode signals MD1–0, the address controlling unit 30 outputs, as the external address signal ADD0–11, the internal address signal IA1–12 outputted from the CPU core 10. Note that the data terminals DT16–63 not in use are used as, for example, port terminals or the like.

The CPU core 10 asserts the read signal RDX when reading data from the SRAM 52, and executes the read operation in a unit of 16 bits. Further, the CPU core 10 asserts at least one of the write signals WR0X, WR1X when writing data to the SRAM 52. The write operation is executed in a unit of 8 bits when one of the write signals WR0X, WR1X is asserted, and in a unit of 16 bits when the write signals WR0C, WR1X are both asserted.

Figure 6:
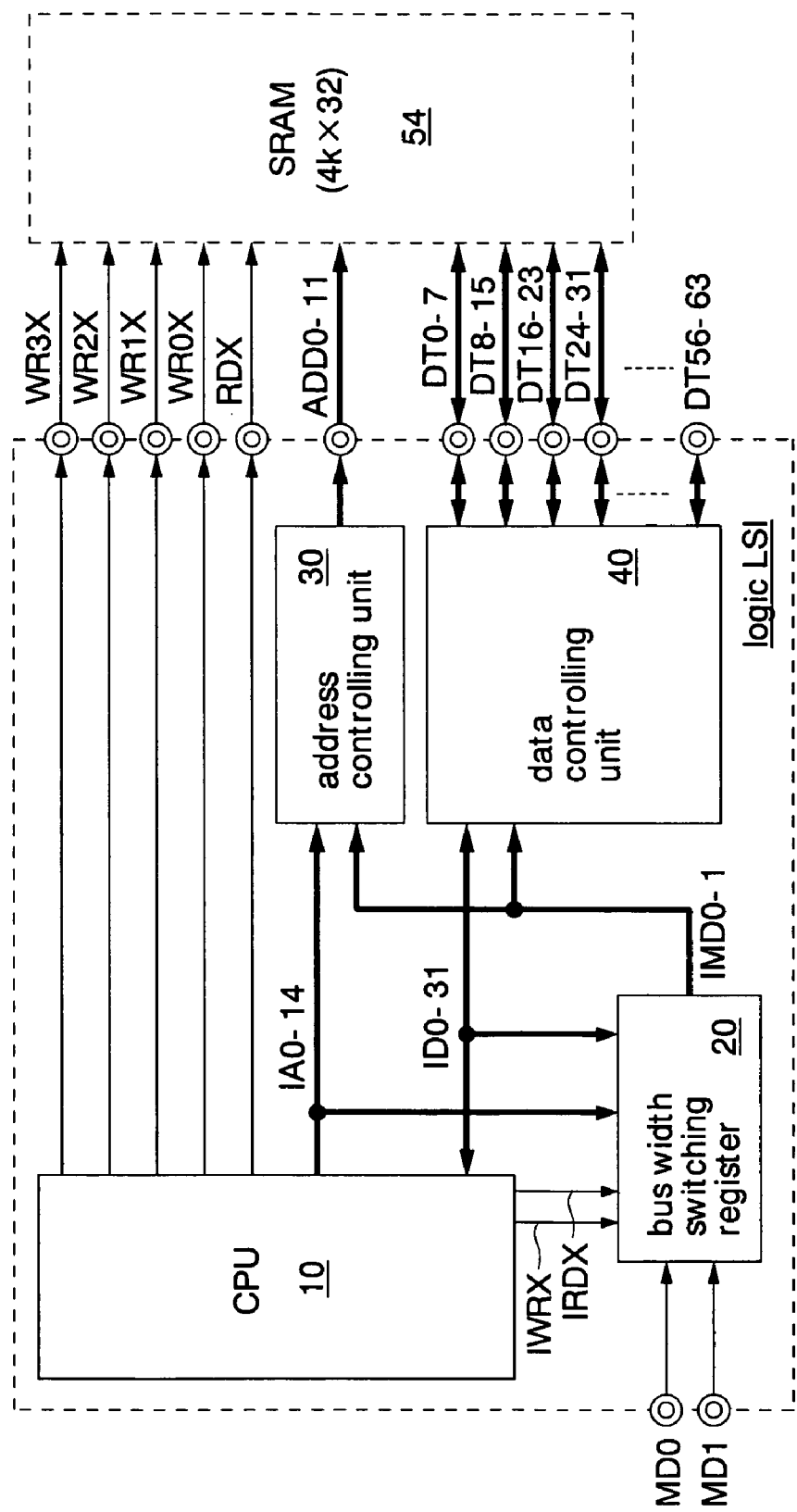
FIG. 6 is a block diagram showing an example where another SRAM is connected to the logic LSI of the first embodiment.

FIG. 6 shows an example where a different SRAM (external memory) is connected to the logic LSI of the first embodiment. In this example, a 16-kbyte SRAM 54 having 12-bit address terminals (4 k address space) and 32-bits (4-byte) data terminals is connected to the logic LSI on the system board. The address terminals and the data terminals of the SRAM 54 are connected to the address terminals ADD0–11 and the data terminals DT0–31 of the logic LSI respectively. Here, the system board constantly supplies the logic LSI with the mode signals MD1–0 having "logics 10". This causes the logic LSI to operate under the recognition that the bus width of the active external data signal DT is 32 bits (DT0–31). According to the mode signals MD1–0, the address controlling unit 30 outputs, as the external address signal ADD0–11, the internal address signal IA2–13 outputted from the CPU core 10. Note that the data terminals DT32–63 not in use are used as, for example, port terminals or the like.

The CPU core 10 asserts the read signal RDX when reading data from the SRAM 54 and executes the read operation in a unit of 32 bits. Further, the CPU core 10 asserts at least one of the write signals WR0X to WR3X when writing data to the SRAM 54. The write operation is executed, for example, in a unit of 8 bits when one of the write signals WR0X to WR3X is asserted, and in a unit of 32 bits when all the write signals WR0X to WR3X are simultaneously asserted.

Figure 7:
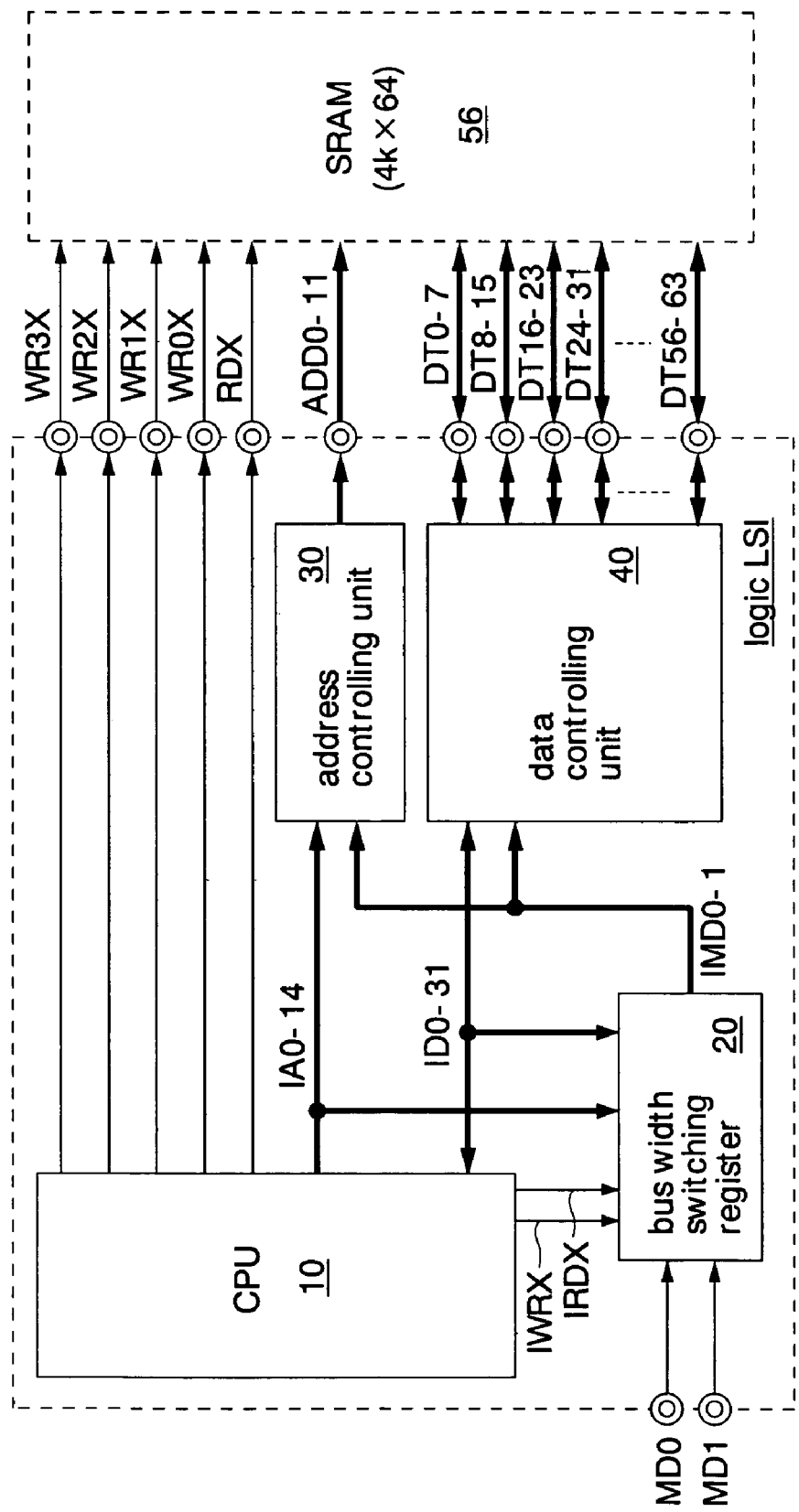
FIG. 7 is a block diagram showing an example where another SRAM is connected to the logic LSI of the first embodiment.

FIG. 7 shows an example where a different SRAM (external memory) is connected to the logic LSI of the first embodiment. In this example, a 32-kbyte SRAM 56 having 12-bit address terminals (4 k address space) and 64-bits (8-byte) data terminals is connected to the logic LSI on the system board. The address terminals and the data terminals of the SRAM 56 are connected to the address terminals ADD0–11 and the data terminals DT0–63 of the logic LSI respectively. Here, the system board constantly supplies the logic LSI with the mode signals MD1–0 having "logics 11". This causes the logic LSI to operate under the recognition that that the bus width of the active external data signal DT is 64 bits (DT0–63). According to the mode signals MD1–0, the address controlling unit 30 outputs, as the external address signal ADD0–11, the internal address signal IA3–14 outputted from the CPU core 10.

The CPU core 10 asserts the read signal RDX when reading data from the SRAM 56 and executes the read operation in a unit of 64 bits. Further, the CPU core 10 asserts at least one of the write signals WR0X to WR3X when writing data to the SRAM 56. The write operation is executed, for example, in a unit of 16 bits when one of the write signals WR0X to WR3X is asserted, and in a unit of 64 bits when all the write signals WR0X to WR3X are simultaneously asserted. Therefore, the minimum unit of the write operation is 16 bits. The use of a CPU core capable of outputting 8 write signals WRX will allow the setting of the minimum unit of the write operation to 8 bits similarly to the above-described FIG. 4 to FIG. 6.

As described above, in this embodiment, since the bits of the internal address signal IA outputted as the external address signal ADD are switched inside the logic LSI when the bus width of the data signals DT increases, the existence of the external address terminal ADD not in use can be prevented. As a result, it is possible to prevent the increase in chip cost of the logic LSI caused by the existence of the unused external address terminal ADD. In addition, an accessible external memory capacity can be increased.

With the simple selectors 44, it is possible to shift the selected bit group of the internal address signal IA to an upper order by one bit every time "m" of the bus width (2 bits to the mth power) of the external data signal increases by one. In other words, the internal address signal IA outputted as the external address signal ADD can be switched by simple control.

The logics of the mode signals MD1–0 held by the bus width switching register 20 can be rewritten by the CPU core 10. In other words, since the logic values of the mode signals MD1–0 can be easily rewritten by software, it is possible to easily respond to specification changes and the like by a user. Further, the logics of the mode signals MD1–0 held by the bus width switching register 20 can be read by the CPU core 10. This can facilitate the execution of an operation test of the bus width switching register 20, for example, during a test process or the like of the logic LSI.

The formation of the mode terminals receiving the mode signals MD1–0 allows initial setting of the logic values of the mode signals MD1–0 by hardware. The construction of a user-friendly memory system is realized by, for example, such a configuration that the initial values of the mode signals MD1–0 are supplied to the mode terminals from the system board on which the logic LSI is mounted and the initial values held by the bus width switching register 20 are written by software executed by the CPU core 10 when necessary.

Figure 8:
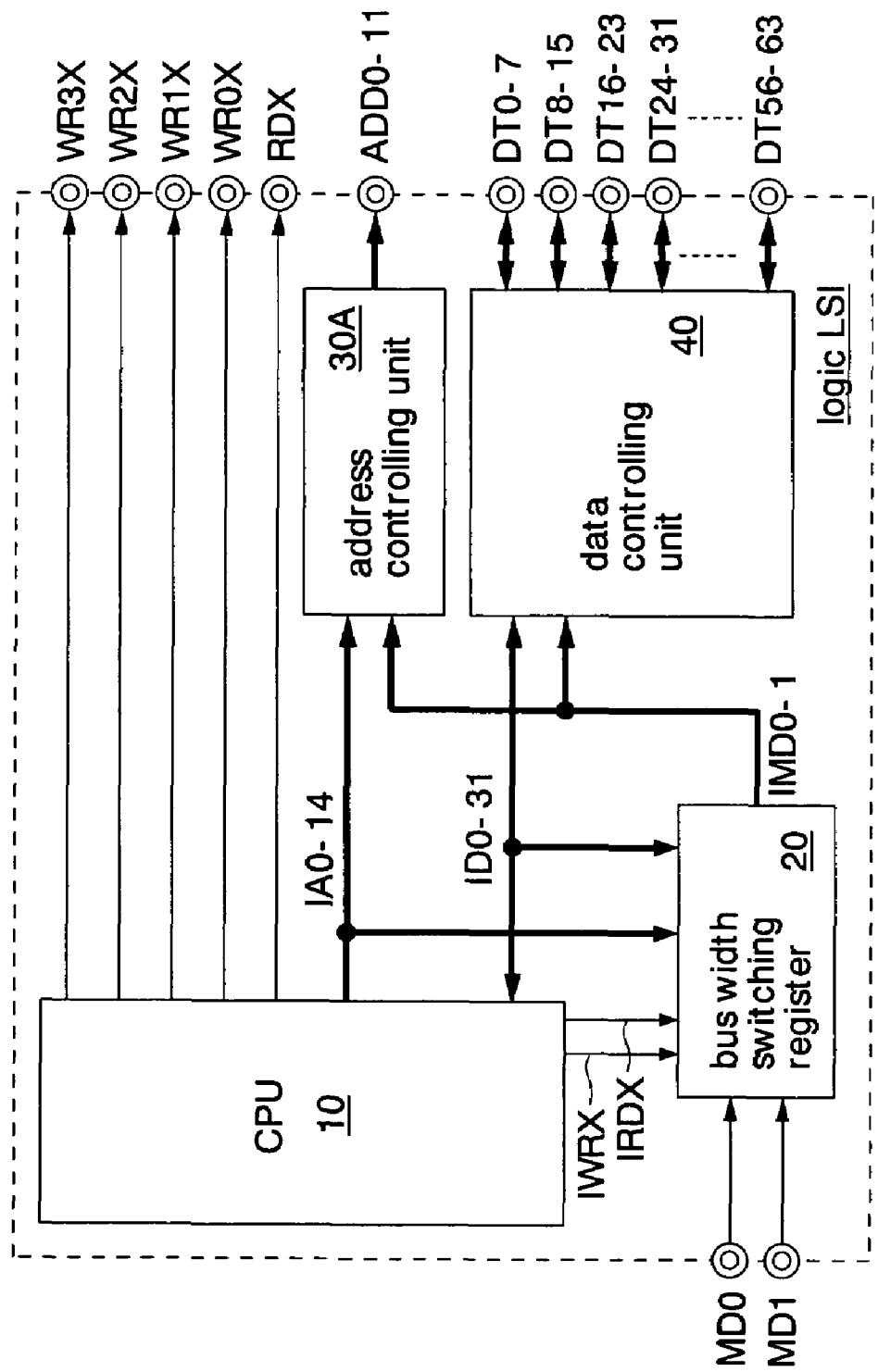
FIG. 8 is a block diagram showing a second embodiment of the semiconductor integrated circuit of the present invention.

FIG. 8 shows a second embodiment of the semiconductor integrated circuit of the present invention. The same reference numerals and symbols are used to designate the same elements as the elements described in the first embodiment, and detailed explanation thereof will be omitted. The semiconductor integrated circuit of this embodiment is formed as a logic LSI having a built-in CPU.

The logic LSI has an address controlling unit 30A in place of the address controlling unit 30 of the logic LSI of the first embodiment. The other configuration is substantially the same as that of the first embodiment. Similarly to the address controlling unit 30 of the first embodiment, the address controlling unit 30A receives internal address signal IA0–14 and internal mode signals IMD1–0 and outputs external address signal ADD0–11.

Figure 9:
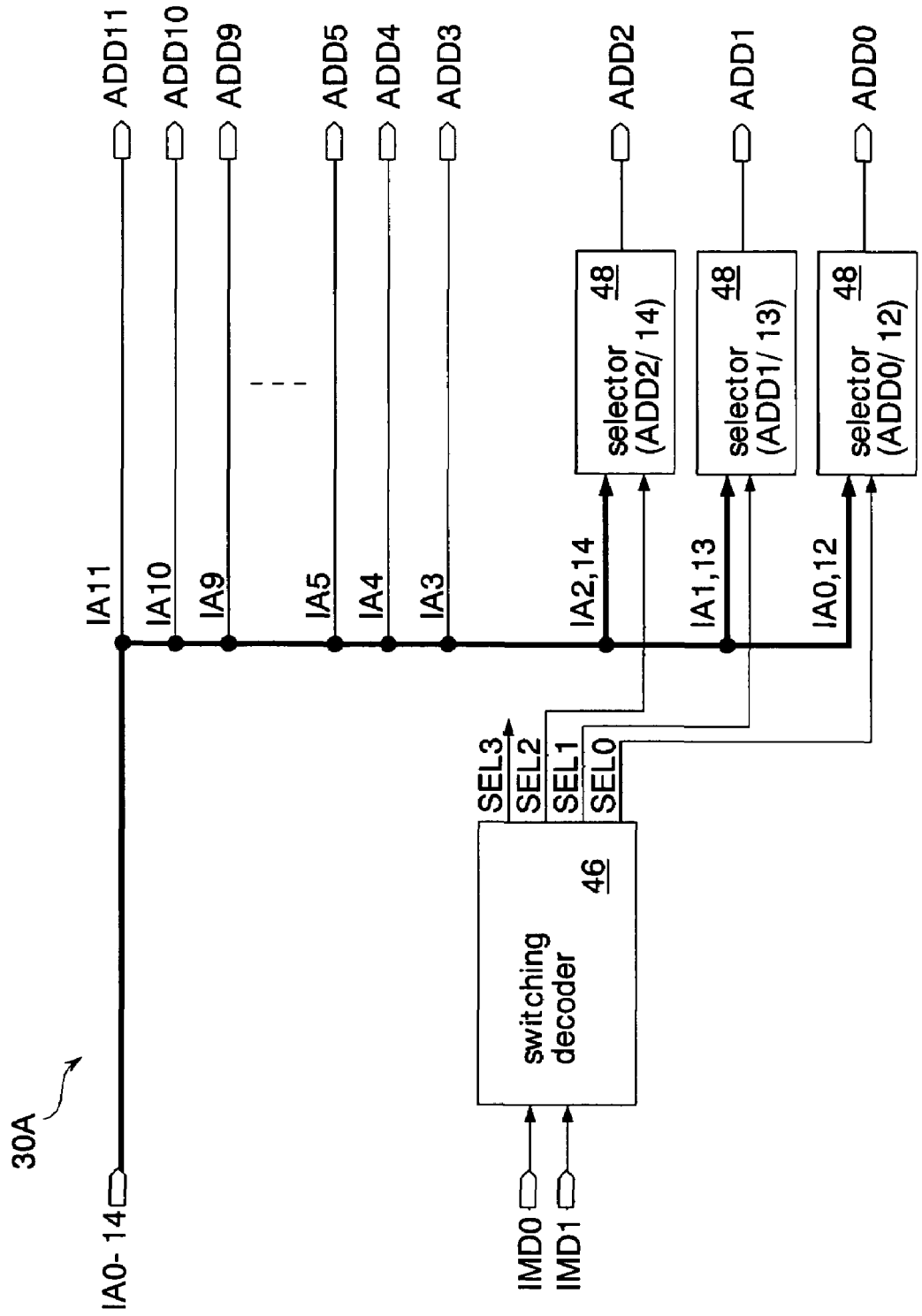
FIG. 9 is a block diagram showing in detail an address controlling unit shown in FIG. 8.

FIG. 9 shows in detail the address controlling unit 30A shown in FIG. 8. The address controlling unit 30A has a switching decoder 46 and selectors 48 corresponding to the respective external address signals ADD0, ADD1, ADD2. The 15-bits internal address signal IA0–14 consist of fixed bits IA3–11 constantly outputted as the external address signal ADD3–11 and variable bits IA0/12, IA1/13, IA2/14, one bit in each pair being switchingly selected according to the mode signals MD1–0 to be outputted as the external address signal ADD (ADD0–2) from each of the selectors 48.

The switching decoder 46 outputs selection signals SEL (SEL0–3) with predetermined logic levels according to the levels of the internal mode signals IMD1–0. The selection signal SEL0 is supplied to the selector 48 outputting the external address signal ADD0. The selection signal SEL1 is supplied to the selector 48 outputting the external address signal ADD1. The selection signal SEL 2 is supplied to the selector 48 outputting the external address signal ADD2. The selection signal SEL 3 is not used in this embodiment.

Each of the selectors 48 receives a lower bit IA0 (or IA1–2) than the fixed bits IA3–11 and an upper bit IA12 (or IA13–14) than the fixed bits IA3–11, and outputs, as the external address signal ADD, one of the internal address signals IA received according to the logic level of the selection signal SEL. For example, the selector 48 in the middle in the drawing selects the internal address signal IA1 when the selection signal SEL1 has a high level and outputs the selected signal as the external address signal ADD1.

FIG. 10 shows the operation of the address controlling unit 30A shown in FIG. 9. The relationship between the logic values of the mode signals MD1–0 and the bus width of external data signal DT is the same as that of the first embodiment. When the logic values of the mode signals MD1–0 are "00", "01", "10", and "11", the switching decoder 46 sets the selection signals SEL2–0 to "HHH", "HHL", "HLL", and "LLL"respectively.

When the mode signals MD1–0 have "logics 00", the internal address signal IA2–0 is outputted as the external address signal ADD2–0. When the mode signals MD1–0 have "logics 01", the internal address signal IA2–1, 12 is outputted as the external address signal ADD2–0. When the mode signals MD1–0 have "logics 10", the internal address signal IA2, 13, 12 is outputted as the external address signal ADD2–0. When the mode signals MD1–0 have "logics 11", the internal address signal IA14, 13, 12 is outputted as the external address signal ADD2–0.

Thus, each of the selectors 48 outputs one of the different bits IA2/IA14, IA1/IA13, or IA0/IA12 of the internal address signal IA according to the mode signals MD1–0. In other words, the selector 48 switches the lower bit (for example, IA0) of the variable bits to the upper bit (for example, IA12) subsequent to the upper most bit IA11 of the fixed bits every time "m" in 2 bits to the mth power of the external data signal DT increases by one (for example, from 8 bits to 16 bits). The external address terminals ADD2–0 function as common terminals of the internal address signals IA2/IA14, IA1/IA13, IA0/IA12, respectively.

When the logics of the mode signals MD1–0 are "00", "01", "10", and "11", the memory capacities accessible by the logic LSI, are 4 kB (kilobyte), 8 kB, 16 kB, and 32 kB respectively, similarly to those of the first embodiment. Thus, in this embodiment, with the minimum number of selectors 48, it is possible to change the correspondence relationship between the bits of the internal address signal IA and the bits of the external address signal ADD.

In this embodiment, the same effects as those of the above-described first embodiment are also obtainable. In addition, in this embodiment, the bits of the internal address signal IA consist of the fixed bits IA11–3 and the variable bits IA0/12, IA1/13, and IA2/14, and the selectors 48 corresponding only to the variable bits are formed. Therefore, switching of the internal address signal IA outputted as the external address signal ADD is realized with the minimum number of the selectors 48. As a result, the chip size of the logic LSI can be reduced.

Figure 11:
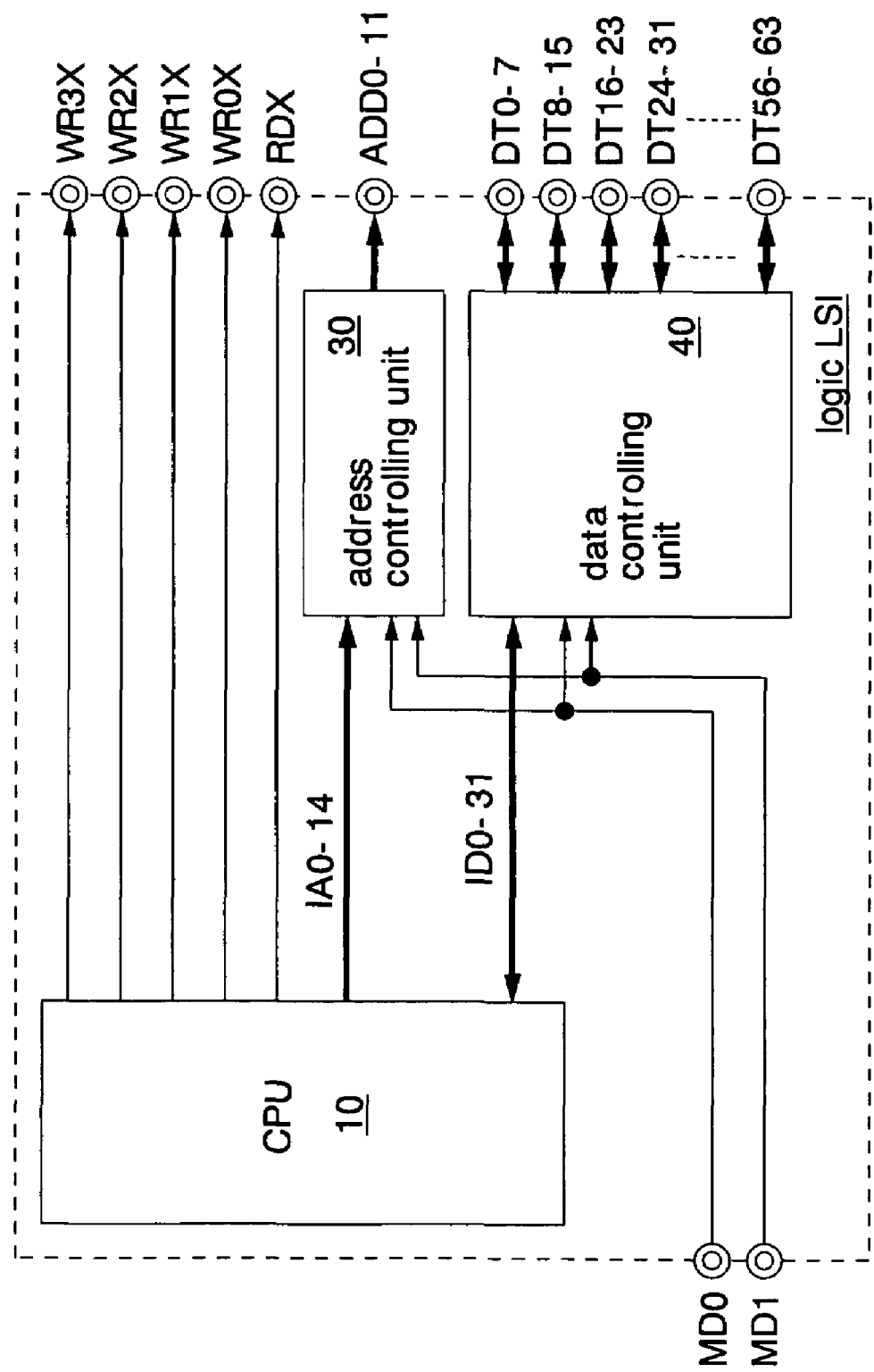
FIG. 11 is a block diagram showing a third embodiment of the semiconductor integrated circuit of the present invention.

FIG. 11 shows a third embodiment of the semiconductor integrated circuit of the present invention. The same reference numerals and symbols are used to designate the same elements as the elements described in the first embodiment, and detailed explanation thereof will be omitted. The semiconductor integrated circuit of this embodiment is formed as a logic LSI having a built-in CPU.

The logic LSI of this embodiment does not have the bus width switching register 20 of the logic LSI of the first embodiment. Therefore, mode signals MD1–0 received via mode terminals are directly supplied to an address controlling unit 30 and a data controlling unit 40. In other words, the width of a data bus of the logic LSI is set via a system board on which the logic ISI is mounted. The other configuration is the same as that of the first embodiment.

In this embodiment, the same effects as those of the above-described first embodiment are also obtainable. In addition, in this embodiment, the logic values of the mode signals MD1–0 can be easily set from an exterior of the logic LSI via the mode terminals MD.

Figure 12:
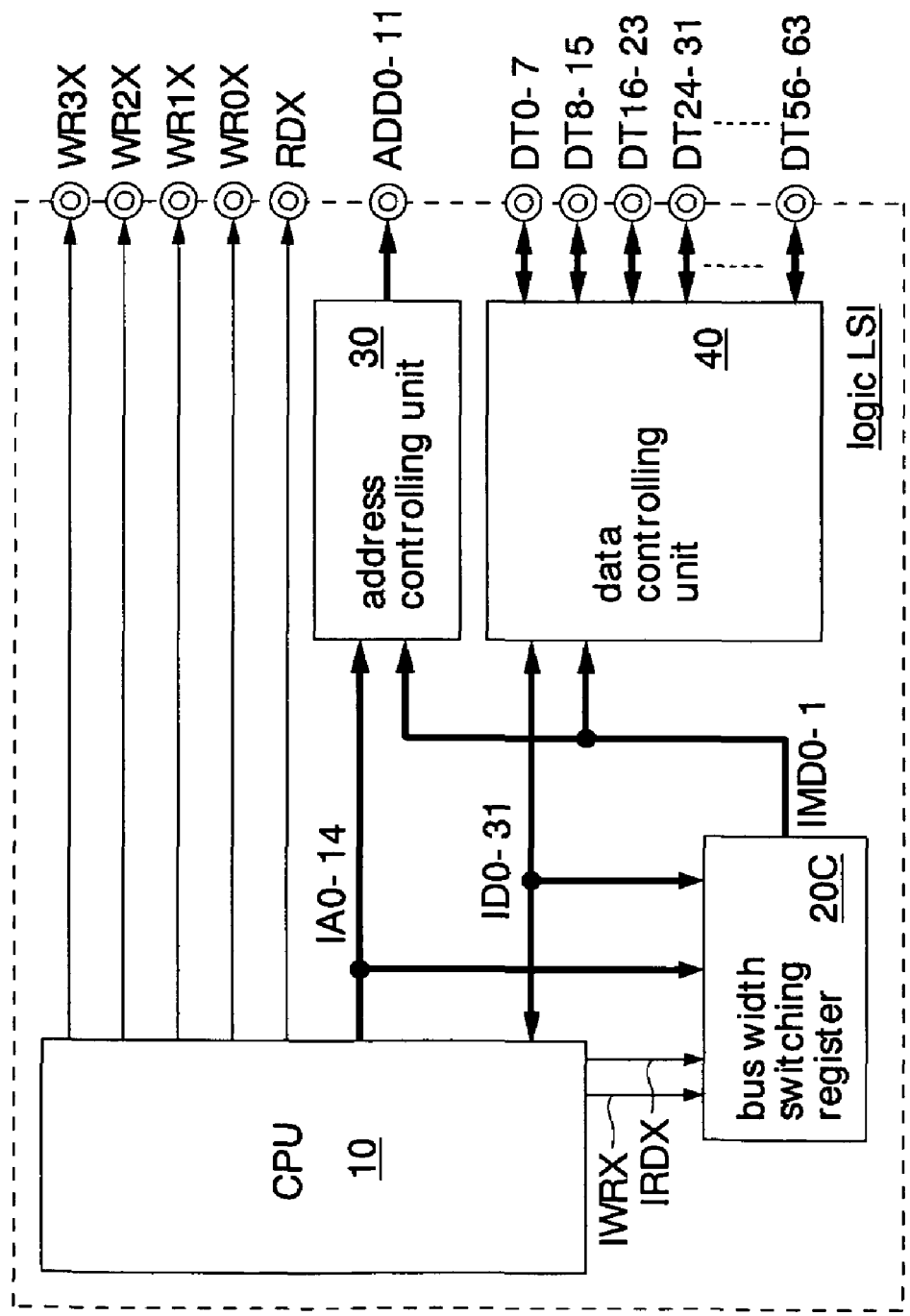
FIG. 12 is a block diagram showing a fourth embodiment of the semiconductor integrated circuit of the present invention.

FIG. 12 shows a fourth embodiment of the semiconductor integrated circuit of the present invention. The same reference numerals and symbols are used to designate the same elements as the elements described in the first embodiment, and detailed explanation thereof will be omitted. The semiconductor integrated circuit of this embodiment is formed as a logic LSI having a built-in CPU.

The logic LSI has a bus width switching register 20C in place of the bus width switching register 20 of the logic LSI of the first embodiment. The other configuration is substantially the same as that of the first embodiment. The bus width switching register 20C is not connected to external terminals of the logic LSI and read therefrom and write thereto can be executed only by a CPU core 10. In other words, the width of a data bus of the logic LSI is set by a program executed by the CPU core 10. Specifically, the width of the data bus is set to 8 bits (a default value) immediately after power-on reset of the logic LSI. During power-on sequence after the power-on reset, the CPU core 10 reads data indicating the width of the data bus from an external memory or the like and writes the data to the bus width switching register 20C.

In this embodiment, the same effects as those of the above-described first embodiment are also obtainable.

Figure 13:
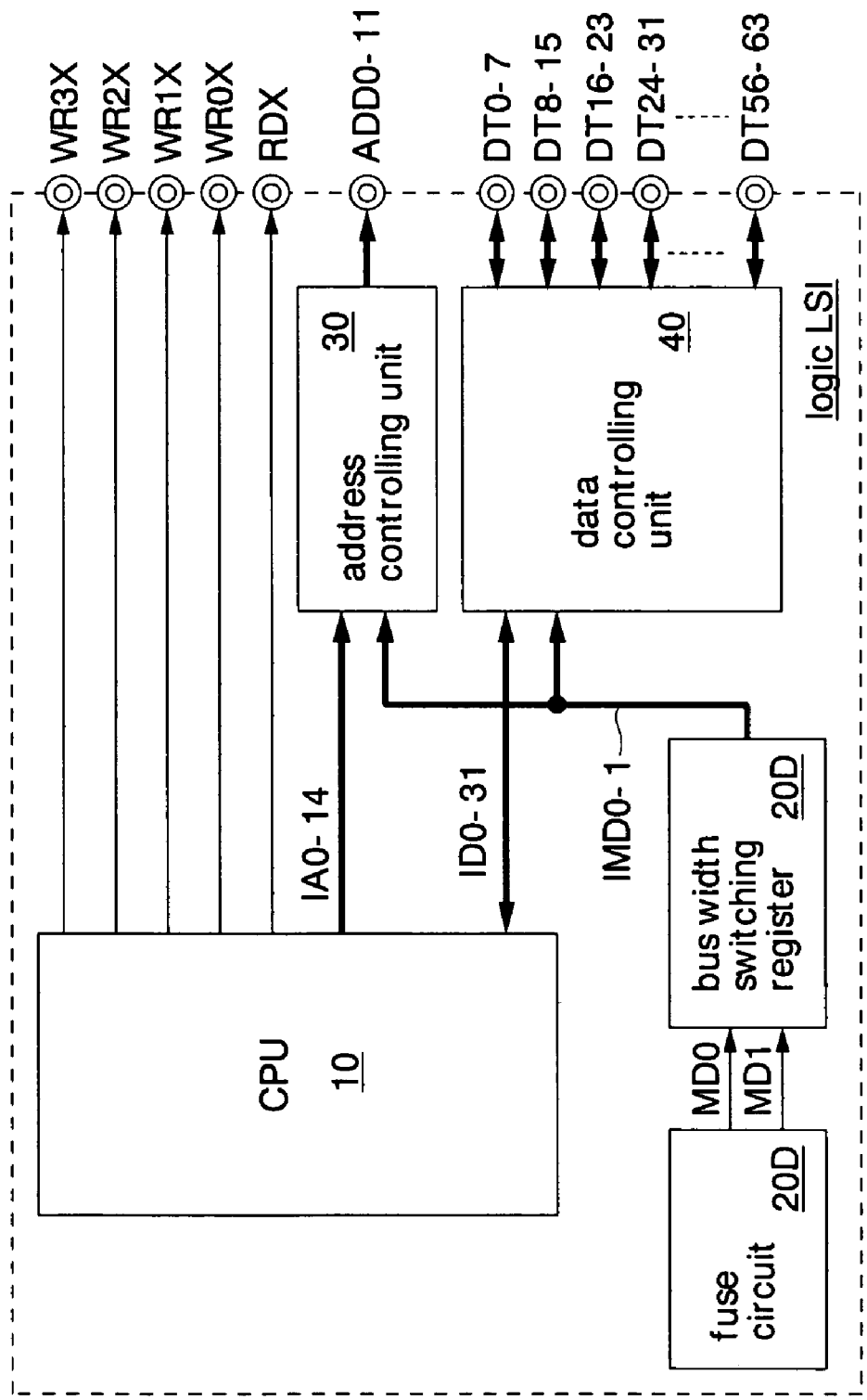
FIG. 13 is a block diagram showing a fifth embodiment of the semiconductor integrated circuit of the present invention.

FIG. 13 shows a fifth embodiment of the semiconductor integrated circuit of the present invention. The same reference numerals and symbols are used to designate the same elements as the elements described in the first embodiment, and detailed explanation thereof will be omitted. The semiconductor integrated circuit of this embodiment is formed as a logic LSI having a built-in CPU.

The logic LSI has a fuse circuit 20D in place of the external terminals receiving the mode signals MD1–0 of the first embodiment. The other configuration is substantially the same as that of the first embodiment. The fuse circuit 20D has a set of not-shown fuses and a control circuit that outputs logic 1 or logic 0 as mode signals MD1–0 according to a programmed state of the fuses. The logic levels of the mode signals MD1–0 outputted by the fuse circuit 20D are set during a power-on reset period of the logic LSI according to the programmed state of the fuses. The fuse circuit 20D is programmed during a fabrication process of the logic LSI.

In this embodiment, the same effects as those of the above-described first embodiment are also obtainable. In addition, in this embodiment, the logic values (initial values) of the mode signals MD1–0 can be set during the fabrication process of the semiconductor integrated circuit.

In the above-described fifth embodiment, described is the example where the bus width switching register 20D holds the logic values of the mode signals MD1–0 outputted from the fuse circuit 20D. The present invention is not limited to such an embodiment. The logical values held by the bus width switching register may be readable/writable by a CPU core 10 similarly to the first embodiment. In this case, it is possible to set the logic values (initial values) of the mode signals MD1–0 during the fabrication process of the logic LSI and, thereafter, to rewrite the logic values of the mode signals MD1–0 by software on a user system on which the logic LSI and a semiconductor memory are mounted.

The invention is not limited to the above embodiments and various modifications may be made without departing from the spirit and scope of the invention. Any improvement may be made in part or all of the components.

What is claimed is:

1. A semiconductor integrated circuit comprising:
   a controller outputting an internal address signal consisting of a plurality of bits for accessing an external memory;
   a data controlling unit that activates a predetermined number of data terminals among a plurality of data terminals according to a mode signal to receive/output an external data signal from/to the external memory via the activated data terminals, and that converts the external data signal to an internal data signal with a bus width corresponding to said controller in order to receive/output the external data signal from/to said controller; and
   an address controlling unit that selects a predetermined number of continuous bits of the internal address signal according to the mode signal, and outputs an address signal consisting of the selected bits to the external memory as an external address signal, wherein
   said address controlling unit sequentially selects upper bits of the internal address signal and sequentially unselects lower bits of the internal address signal when a bus width of the external data signal is sequentially increased according to the mode signal.

2. The semiconductor integrated circuit according to claim 1, wherein:
   the mode signal is a signal representing the bus width of the external data signal, the bus width being 2 bits to the mth power; and
   said address controlling unit selects continuous n bits of the internal address signal, and every time the value of m is increased by one, shifts the bit group to be selected of the internal address signal to an upper order by one bit.

3. The semiconductor integrated circuit according to claim 2, further comprising
   a plurality of selectors corresponding to the bits of the external address signal, respectively, each of said selectors selecting one of the continuous plural bits of the internal address signal according to the mode signal.

4. The semiconductor integrated circuit according to claim 3, wherein
   the bits of the internal address signal received by said selectors are partly the same, said selectors corresponding to the external address signal whose bits are adjacent to each other.

5. The semiconductor integrated circuit according to claim 1, wherein:
   the mode signal is a signal representing the bus width of the external data signal, the bus width being 2 bits to the mth power; and
   said address controlling unit selects continuous n bits of the internal address signal, the n bits consisting of: fixed bits that are predetermined bits of the internal address signal and are constantly outputted as a part of the external address signal; and variable bits which are different bits of the internal address signal and one of which is selected according to the mode signal to be outputted as an another part of the external address signal, and said address controlling unit switches a lower bit of the variable bits to an upper bit subsequent to the upper most bit of the fixed bits every time the value of m is increased by one.

6. The semiconductor integrated circuit according to claim 5, further comprising
   at least one selector corresponding to a lower bit of the external address signal and selecting one of 2 bits of the internal address signal according to the mode signal.

7. The semiconductor integrated circuit according to claim 6, wherein
   said at least one selector receives a lower bit and an upper bit than the fixed bits.

8. The semiconductor integrated circuit according to claim 1, further comprising:
   a bus width switching register holding a logic value represented by the mode signal; and
   a data bus that transmits rewrite data outputted from said controller to said bus width switching register in order for said controller to rewrite the logic value held by said bus width switching register, wherein
   said address controlling unit and said data controlling unit operate according to the logic value held by said bus width switching register.

9. The semiconductor integrated circuit according to claim 8, further comprising
   a mode terminal receiving the mode signal from an exterior of the semiconductor integrated circuit, wherein
   the logic value held by said bus width switching register is set according to the mode signal supplied to said mode terminal, until the logic value is rewritten by said controller.

10. The semiconductor integrated circuit according to claim 8, further comprising
    a data bus that transmits the logic value held by said bus width switching register to said controller in order for said controller to read the logic value.

11. The semiconductor integrated circuit according to claim 8, further comprising
    a program circuit having a predetermined logic value programmed in advance and outputting the mode signal according to the predetermined logic value, wherein
    the logic value held by said bus width switching register is set according to the mode signal outputted from said program circuit, until the logic value is rewritten by said controller.

12. The semiconductor integrated circuit according to claim 1, further comprising
    a mode terminal receiving the mode signal from an exterior of the semiconductor integrated circuit.

13. The semiconductor integrated circuit according to claim 1, further comprising
    a program circuit having a predetermined logic value programmed in advance and outputting the mode signal according to the predetermined logic value.

14. A semiconductor integrated circuit comprising:

a controller outputting an internal address signal consisting of a plurality of bits for accessing an external memory; and an address controlling unit that selects a predetermined number of continuous bits of the internal address signal according to a mode signal, wherein said address controlling unit sequentially selects upper bits of the internal address signal and sequentially unselects lower bits of the internal address signal according to the mode signal.

* * * * *